United States Patent

[11] 3,569,782

[72] Inventors Jalal T. Salihi
Birmingham;
George J. Spix, Clawson, Mich.
[21] Appl. No. 822,187
[22] Filed May 6, 1969
[45] Patented Mar. 9, 1971
[73] Assignee General Motors Corporation
Detroit, Mich.
Original application June 30, 1967, Ser. No. 650491, now Patent No. 3,471,764.

[54] FREQUENCY OF COMBINING APPARATUS
4 Claims, 6 Drawing Figs.
[52] U.S. Cl. ................................................. 317/6,
310/68, 310/114, 310/171, 318/231
[51] Int. Cl. ........................................................ H02k 17/42,
H02k 17/30
[50] Field of Search........................................... 317/5, 6;
310/114, 115, 168, 171,

[56] References Cited
UNITED STATES PATENTS
2,896,101 7/1959 Laskin........................... 310/171

| | | | |
|---|---|---|---|
| 2,896,143 | 7/1959 | Bekey.......................... | 318/231X |
| 3,164,760 | 1/1965 | King............................ | 318/231X |
| 3,293,520 | 12/1966 | Lehry........................... | 318/231X |
| 3,320,506 | 5/1967 | Humphrey.................... | 318/231 |
| 3,445,697 | 5/1969 | Costa........................... | 310/114X |

Primary Examiner—Lee T. Hix
Attorneys—Creighton R. Meland and Robert W. Smith

ABSTRACT: In a preferred form, a frequency-combining device is provided with two rotational members including complementary magnetic elements which are respectively rotated adjacent to an inductance coil by a main motor and an auxiliary motor to vary the coil inductance. The coil is connected in a tuned resonant circuit and the relative rotating magnetic elements periodically align to form low reluctance paths in the magnetic field of the coil to thereby modulate the impedance of the resonant circuit at a frequency proportional to the sum or difference of the speeds of the two motors and the number of magnetic elements. Pulse signals produced in the resonant circuit are suitable for controlling the frequency and timing of signals applied to an AC induction motor whereby the speed of the auxiliary motor controls predetermined slip frequencies in the induction motor.

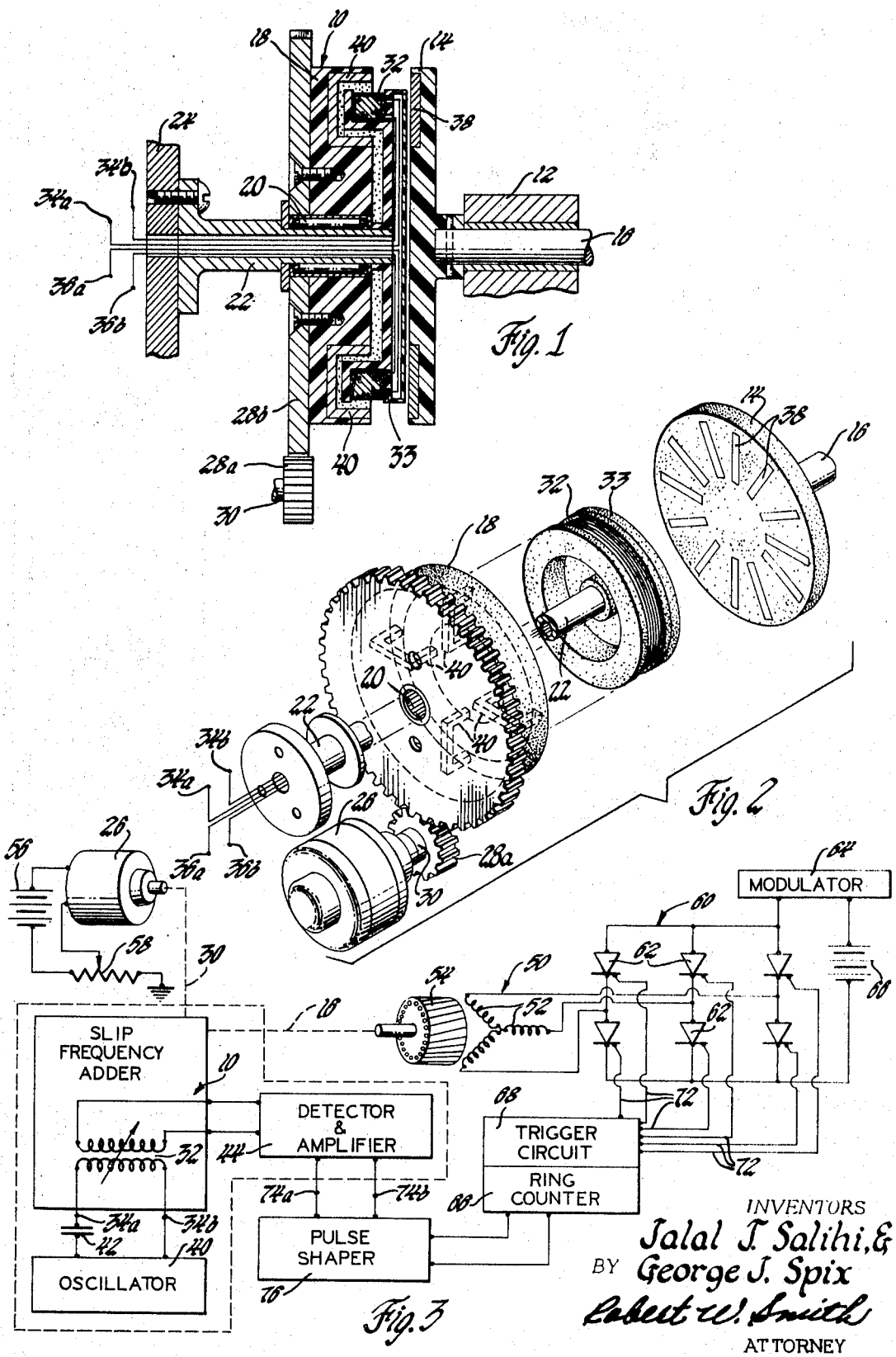

TO PULSE SHAPER
CIRCUIT 76 IN

INVENTORS
Jalal T. Salihi, &
BY George J. Spix
Robert W. Smith
ATTORNEY

FREQUENCY OF COMBINING APPARATUS

This is a division of application U.S. Serial No. 650,491, filed June 30, 1967, now U.S. Pat. No. 3,471,764 issued Oct. 7, 1969, and assigned to the assignee of this invention.

In the field of induction motor control systems one method employed to control motor speed and torque is by the control of the slip frequency since at any speed the torque of an induction motor is proportional to the slip frequency. As disclosed in United States Patent No. 3,323,032, for an Electric Drive System, issued May 30, 1967, and assigned to the assignee of this invention, these systems employ a power source supplying variable frequency signals to the induction motor. Variable frequency sources utilized include inverter circuits having solid state semiconductor devices controlled by triggering signals which are proportional to the combined motor frequency and the frequency of a separate source of signals which corresponds to the slip frequency. The inverter is triggered in a three phase sequence to produce the motor's synchronous frequency with the motor slip controlled by the slip frequency source.

As disclosed further inthe aforementioned U.S. Pat. No. 3,323,023, one technique utilized to combine the signals is to combine a source of slip frequency with the signals of a tachometer pickup device attached to the induction motor shaft. The amplitude of electromagnetic pickup signals often vary with speed changes and further the signals must be combined in a complicated frequency signal combining circuit. Another technique utilized is to combine the induction motor shaft speed and the speed of a servometer shaft in a differential gear mechnism and then convert the output of the gear mechanism into an electric frequency signal in a associated speed sensing circuit.

The present invention resides in a frequency combining apparatus directly producing signals at a frequency related to the combined speeds of two rotating shafts and more particularly to a variable reluctance frequency combining apparatus having rotatable low magnetic reluctance elements connected to rotating shafts to vary the reluctance of magnetic circuits of a coil and therefore the inductance of the coil in accordance with the combined shaft speeds.

Briefly, the slip frequency combining apparatus of the present invention includes a device having a first rotatable member connected to the shaft of a variable speed induction motor and a second rotatable member connected to the shaft of a slip frequency servomotor with both members including low magnetic reluctance elements radially disposed so as to be periodically aligned in the field of a coil to periodically vary the inductice impedance of a tuned circuit frequency sensing circuit. Signals are produced in the sensing circuit having a frequency corresponding to the combined speeds of the first and second rotatable members to thereby combine the induction motor rotor speed and slip frequency servometer speed and provide a signal for controlling the timing and frequency of a variable frequency power source supplying the motor synchronous frequency.

Accordingly, an object of this invention is to provide a variable reluctance frequency combining apparatus including relatively rotatable magnetic elements which vary the inductance of a coil to produce electrical signals having a frequency controlled by the combined rotational speeds of the elements.

Another object of this invention is to provide a variable reluctance frequency combining device including low reluctance magnetic elements supported and rotated by both the shafts of a main motor and an auxiliary servometer having a controllable speed.

A further object of this invention is to provide a variable reluctance frequency adding and subtracting apparatus including a first disc rotated by an iduction motor and a second disc rotated by an auxiliary servomotor with the discs having complementary low reluctance magnetic elements rotated in the electromagnetic field of an inductance coil to thereby vary the inductance of the coil at a rate corresponding to the sum or difference of speeds of the induction motor and the auxiliary servomotor.

A still further object of the invention is to provide a variable reluctance frequency combining apparatus in a motor power supply to control an AC induction motor and including a first rotatable member having a plurality of low reluctance elements determined by the number of motor poles and a second rotatable member also including a plurality of low reluctance element complementary to the elements of the first rotatable member to form successive low reluctance paths in the field of an inductance coil connected in a tuned resonant sensing circuit. Variation of the coil inductance due to the speeds of both the first and second rotatable members produces a signal proportional to a predetermined slip frequency and the motor rotor frequency to provide trigger signals for controlling the frequency of a variable frequency power source which supplies power to the AC induction motor.

In the drawings:

FIG. 1 is a cross-sectional view of the frequency combining apparatus of the present invention.

FIG. 2 is an expanded isometric view of the present invention illustrated FIG. 1;

Figure 4:
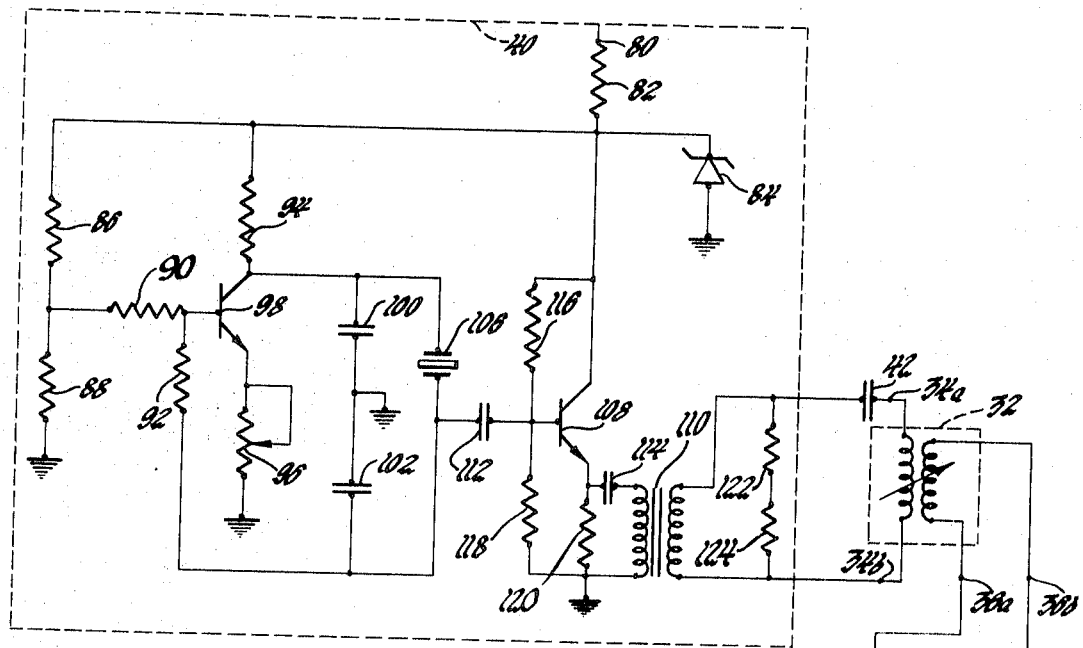
FIG. 4 illustrates a frequency-combining circuit utilized to detect the inductance changes in the frequency-combining apparatus of the present invention.

Referring now to the drawings wherein FIG. 1 illustrates a cross-sectional view of the variable reluctance frequency combining device 10 of the present invention. A stationary support 12 rotatably supports a first rotatable member including a disc 14 connected to a main shaft 16 suitable for connecting with a first or main motor source of rotation such as the shaft of an AC induction motor. A second rotatable member includes the disc 18 rotatably mounted on bearing 20 on fixed shaft 22 coaxially aligned with the shaft 16 and is secured to a housing, partially shown at 24, which also supports stationary support 12. As shown in the expanded view in FIG. 2, disc 18 is rotated by a second or auxiliary servomotor 26 through a gear member 28a mounted on shaft 30 and gear member 28b secured to disc 18. A stationary inductance coil means 32 is wound on a plastic bobbin 33 fixed to the shaft 22 and thereby secured to housing 24. The coil 32 is connected to conductors 34a, 34b, 36a, and 36b running through the center of shaft 22 and are, in turn, connected in a frequency sensing circuit described further hereinbelow.

The first and second rotatable members 14 and 18 includes discs of nonmagnetic material, for example phenolic or plastic compositions in which elements formed of low reluctance magnetic material, such as ferrite, are imbedded. Ferrite material is preferable to magnetic iron because of its higher quality factor and lower eddy current, hysteresis and residual losses. Magnetic elements 38 formed by twelve ferrite bars cut from 1/8 inch bar stock are mounted in radially aligned pairs in equally circumferentially spaced relationship in disc 14 as illustrated in FIG. 2. The second disc 18 is axially aligned with the first disc 14 and includes imbedded magnetic elements 40 formed by two pairs of radially mounted C-shaped ferrite cores which are qually circumferentially spaced and arranged to be coacting with bars 38. Accordingly, the ferrite magnetic elements 38 and 40 form low reluctance magnetic circuit paths when the axially extending ends of the C-shaped cores are axially aligned with two pairs of the bars 38. When using the twelve bars 38, determined as explained further hereinbelow, the number of pairs of C-shaped core 40 will only increase the number of circumferentially parallel low reluctance paths formed and will not change the frequency of the frequencing sensing circuit. As can be seen in either one, two (shown in FIG. 2) or up to six pairs of C-shaped core pairs regularly arranged can be used to improve reluctance changes. The axial separation between the tips of the axially extending ends of the C-shaped cores 40 and the bars 38 in one embodiment is approximately one-eighth of an inch. The stationary inductance coil means 32 is axially disposed between the bar and core magnetic elments as illustrated, so that when they are axially aligned a partially enclosed space is defined receiving the inductance coil means.

With the two rotatable members being rotated in opposite directions, the reluctance of the magnetic field of coil 32 is changed by the periodic alignment of radial pairs of bars 38 with the pairs of C-shaped cores 40 at a rate corresponding the added speeds of the two discs. Combining of frequencies referred to herein is understood to include adding of the shaft speeds when they are rotated in opposite directions or subtracting when the shafts are operated in the opposite directions. As the reluctance of the magnetic field is varied, a change in inductance of the coil 32 occurs and therefore the impedance of a sensing circuit including the coil is varied. The variation occurs in accordance with the combined speeds of the two rotatable members and the number and mounting arrangement of the ferrite elements.

Figure 3:
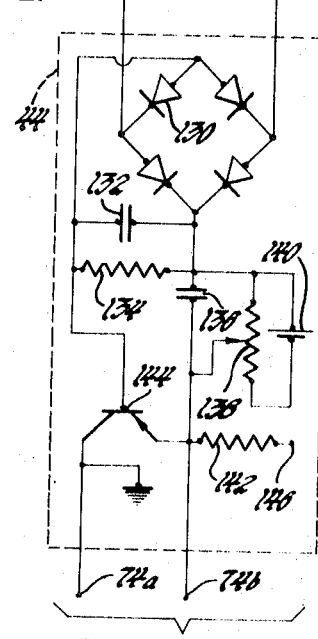
FIG. 3 is a schematic block diagram of an AC induction motor power supply system including the frequency-combining apparatus of the present invention.
Figure 5:
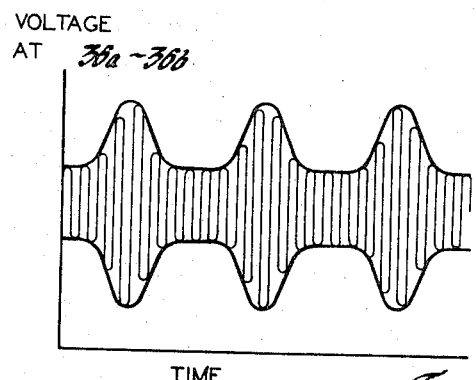
FIG. 5 illustrates the wave form of signals occuring at terminals 34a—34b in the circuit of FIG. 4.
Figure 6:
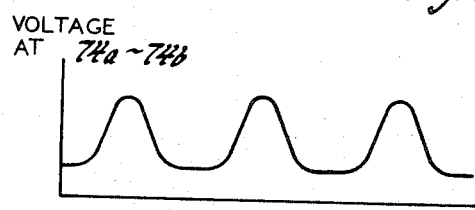
FIG. 6 illustrates the wave forms of signals occuring at terminals 74a—74b in the circuit of FIG. 4.

FIG. 3 illustrates a schematic diagram of a motor power supply system including the frequency combining apparatus of the present invention which produces pulses in response to the variations in the magnetic circuit and therefore the inductance of stationary inductance coil 32. The coil 32 includes a pair of windings forming a step down transformer and is connected in a frequency sensing circuit illustrated more fully in FIG. 4. The primary winding coil 32 is connected to terminals 34a and 34b and the secondary output winding is connected to terminals 36a and 36b. Coil input terminals 34a and 34b connect the primary winding of coil 32 in series with a high frequency carrier oscillator 40 and a capacitor 42 which forms a series tuned resonant circuit with the primary winding. The oscillator supplies signals at a frequency of 100 kiloHertz which is the resonant frequency of the resonant circuit. The signal from oscillator 45 is amplitude modulated by the change in the resonant circuit reactance due to the periodic changing reluctance and the consequent change in inductance of the coil 32 as illustrated in FIG. 5. The output of the resonant circuit is taken at terminals 36a—36b and applied to a combination detector and amplifier circuit 44. The detected pulse signlas are illustrated in FIG. 6.

The motor power supply system illustrated in FIG. 3 corresponds to the system disclosed and described in the abovementioned U.S. Pat. No. 3,323,032, with the frequency-combining device 10 of the present invention replacing the slip frequency addition control means disclosed in the aforementioned patent. The induction motor 50 includes three-phase windings 52 and a squirrel cage rotor 54 connected to the shaft 16 illustrated in FIGS. 1 and 2. The shaft 16 rotates the low reluctance magnetic elements 38 mounted on the nonmagnetic disc 14. The auxiliary servomotor 26 is connected by means of the shaft 30 to the second set of low reluctance magnetic elements 40 of disc 18. The auxiliary servomotor 26 is a reversible variable speed DC motor supplied by a DC course 56 and having avariable speed controlled by a potentiometer 58. Also the motor 26 may be a conventional alternating current motor supplied by a small convertor with speed control provided by varying the converter voltage. In the power supply arrangement the speed of disc 14 is related to the rotor frequency of motor 50 and the speed of disc 18 is related to a predetermined slip frequency.

A solid state inverter 60, illustrating only the power-conducting devices 62, supplies variable frequency signals to the induction motor 60 as described in the aforementioned application U.S. Pat. No. 3,323,032. Power silicon-controlled rectifier devices 62 are triggered every 60 electrical degress in a three-phase sequence. The inverter control includes a voltage modulator 64 for controlling the DC power supplied to the inverter from a DC source which includes a battery, fuel cell or rectified alternating current. Other techniques for modulating such inverters are also well known, for example, phase control and pulse width modulation. The timing and frequency control signals for the inverter 60 are supplied by ring counter and triggering circuits 66 and 68 respectively also described in the aofrementioned application. Triggering signals to the inverter trigger inputs 72 are applied at a rate six times the frequency of the motor power pulses supplied by inverter circuit 60. The signals for the ring counter circuit 66 are supplied from the frequency sensing circuit at the output of the amplifer and detector circuit 40 at terminals 74a and 74b. These output signals are applied to a pulse shaper circuit 76 which includes a conventional Schmitt trigger circuit.

The triggering signals applied to the inverter 60 from trigger circuit 68 and the ring counter 66 require a frequency six times the synchronous frequency of the motor 50. Accordingly, the pulses at the terminals 74a—74b will be at a frequency six times the motor synchronous frequency. Since the speed of shaft 16 is proportional to the rotor frequency of induction motor 50 and the speed of the disc 18 provides the slip frequency, the frequency of pulses at terminals 74a—74b can be equal to the synchronous frequency of the motor 50, although in the system described herein it is multiplied by six times. Conveniently, by means of the present invention, the rotor speed is converted to a rotor frequency in accordance with the equation f =P/2 (R.P.M.)/60 the slip frequency is combined to provide the synchronous frequency, and this frequency is multiplied to provide the frequency of trigger pulses required by the inverter 60. Control of slip frequency of the induction motor 50 is then provided by speed control of slip frequency-determining motor 26.

The number of low reluctance elements and speed of the disc 18 driven by motor 26 are explained in a specific example as follows: Assuming a constant but adjustable slip frequency control system for a four pole AC induction motor having a speed of 12,000 r.p.m. and a predetermined slip the frequency of 6 cps., utilizing the aforementioned equation, the motor synchronous frequency is 400 cps. + 6 cps. or 406 cps. It can be seen with twelve of the ferrite bars 38 radially spaced in pairs and circumferentially spaced every 30° around the disc 14, the two pairs of bars will align with the two pairs of C-shaped elements 40 on disc 18 as the discs rotate. If the speed of motor 26 is zero there will be 12 pulses produced every revolution of disc 14. With the speed of the disc 18 determined as a direct ratio to the speed of disc 14, the motor 26 will turn disc 18 at 180 r.p.m. to produce a slip of frequency of 6 cps. Accordingly, the rate of forming low reluctance paths in the magnetic of the coil 32 will modulate the resonant circuit at a frequency f equal to (number of bars on disc 14) × (speed of disc 14 + speed of disc 18) × 1/60 or 12 × (180 r.p.m. + 12,000 r.p.m.) × 1/60 or 6 (6 +400) which is equal to six times the synchronous frequency of 406 cps. As noted above the trigger signals from ring counter 66 are to occur every 60 electrical degrees or at a rate 6 times the synchronous motor frequency. This is also the frequency of the modulated signals provided directly from the variable reluctance frequency combining apparatus of this invention. It can be seen if a count-of-three counter is used, the trigger signal frequently of three times the synchronous frequency is provided using three pairs of bars 38.

The above example illustrates the addition of slip frequency and rotor frequency. To provide regenerative braking, disc 18 can be reversed thereby subtracting the slip frequency from the rotor frequency so that the motor input frequency is less than the rotor frequency and brake the motor 50.

Referring to FIG. 4 the frequency-sensing circuit is shown in detail including a series turned resonant sensing circuit noted hereinabove. Although this circuit is preferable, other known inductance responsive circuit arrangements can be used to sense the variations in inductance of the coil 32, for example, an AC inductance bridge network. The series capacitor 42 and primary winding of coil 32 form a series resonant circuit tuned to 100 kH which is the frequency of signals produced by oscillator 40. Oscillator 40 is a known crystal-controlled type which is known to be reliable and capable of being mounted in a small space. The oscillator circuit is supplied by a 22 volt DC source at 80.

The values of the oscillator elements are noted as an example only and not limitation as follows:

Resistance 82    51 ohms

Diode 84    Zener type IN720

Resistance 86    36 Kilohms

Resistance 88    5.1 kilohms

Resistance 90    10 kilohms

Resistance 92    1 kilohms

Resistance 94    2 kilohms

Potentiometer 96    1 kilohms

Transistor 98    Type 2N1306

Capacitor 100    1500 micromicrofarad

Capacitor 102    470 micromicrofarad

Crystal 106    100 kH crystal

The output of crystal oscillator 40 is coupled through an impedance matching network including the emitter-follower connected to the transistor 108 and transformer 110. The low impedance source of oscillator carrier signals is then provided to match the low impedance of the series resonant combination of the primary winding coil 32 and capacitor 42.

The values of the elements of the impedance matching network are noted as an example only not as a limitation as follows:

Transistor 108    Type 2N1306

Transformer 110    70 turns primary and 5 turns secondary

Capacitor 112    470 micromicrofarad

Capacitor 114    .01 farad

Resistor 116    30 kilohms

Resistor 118    4.7 kilohms

Resistor 120    620 ohms

Resistor 122    2 ohms

Resistor 124    2 ohms.

A series of tuned resonant circuit was found preferable in providing a high resolution of pulses in response to changes of reluctance of the coil 32. A parallel tuned resonant circuit can be used alternatively and the coil 32 can be a single winding coil rather than a two winding transformer coil. In the latter arrangement the output of the resonant circuit is taken from across the capacitance 42.

The amplitude modulated carrier signal illustrated in FIG. 5 is provided at the coil terminals 36a—36b. To provide discrete pulses the oscillator carrier signal is removed and the pulses are amplified in the detector and amplifier circuit 44 to provide a series of pulses signals at output terminals 74a—74b. The detector diode bridge include diodes 130 and the bridge output is applied to the amplifier transistor 144. This circuit is connected to a DC source of 12 volts at terminal 146. The battery 140 and potentiometer 138 control the base bias voltage of transistor 144 to allow adjustment of clipper-action provided in the amplifier circuit.

The signals occuring at output terminals 74a—74b are illustrated in FIG. 6 and these signals will have a frequency corresponding to the combined shaft speeds times the number of pairs of ferrite bars 38. As noted above in connection with FIG. 1, six pairs of ferrite bars 34 are shown and therefore the pulses supplied at the output terminals 74b—74b will have a frequency 12 times the combined speeds of the first and second rotatable members 14 and 18 when the two shaft speeds are added.

By way of example and not limitation, the values of the circuit elements shown in the circuit 44 are as follows:

4 diodes 130    diode 1 N 270

Capacitor 132    .02 microfarad

Resistance k34    3.9 kilohms

Capacitance 136    .15 microfarad

Potentiometer 138    100 ohms

Battery 140    1.5 volts

Resistance 142    3.9 kilohms

Transistor 144    2 N 1037

While only one specific embodiment of the invention has been described in detail, it should be obvious that there are numerous variations of the apparatus of the present invention. For example, the variable reluctance frequency combining apparatus can be utilized to measure the combined speeds of at least two rotating shafts and utilize the resulting electrical output signals in control systems other than a controlled slip frequency AC induction motor power supply as described herein in detail.

We claim:

1. An electrical apparatus for providing a signal which is indicative of the combined rotating speeds of two rotating devices comprising: a first nonmagnetic rotatable member connectable to one of said two rotating devices; a second nonmagnetic rotatable member axially spaced from said first rotatable member and connectable to the other of said two rotating devices, with said first and said second rotatable members being rotated about a common axis; a plurality of circumferentially spaced low reluctance magnetic elements disposed on said first and said second rotatable members in mutual axially opposed and spaced apart relationship for periodic axial alignmnet for successively forming low reluctance magnetic circuit paths when said first and said second rotatable members are rotated; an inductance coil means adapted for connection to a source of high frequency signals that generate a magnetic field adjacent said inductance coil means; said inductance coil means being disposed axially adjacent said first and said second rotatable members so that said magnetic field is directed through said low reluctance magnetic circuit paths whereby the inductance of said coil is varied in response to the periodic axial alignmnet of said plurality of magnetic elements; and output terminals connected in circuit with said inductance coil means for providing said signal at a frequency responsive to the combined rate of rotation of said two rotating devices when said inductance coil is connected to said source of high frequency signals 2. A variable reluctance frequency combining apparatus for providing a signal which is indicative of the combined rotating speeds of two rotating devices comprising: a first mechanical input including a rotatable nonmagnetic support member connected for rotation with one of said two rotating devices; a second mechanical input including a nonmagnetic support member connected for rotation with the other of said two rotating devices, said first and said second support members being axially spaced and rotatable about a common axis of rotation; a magnetic circuit means including a first circumferential series of elongated magnetic elements extending radially on said first support member and terminating at spaced axially extending portions and a second series of elongated magnetic elements extending radially on said second support memners and complementary to said first series of magnetic elements for mutual axial alignmnet therewith, differing preselected elements of said first and second series of magnetic elements being periodicallyk periodically aligned in low reluctance relationship to form magnetic circuit paths defining partially enclosed spaces at circumferentially spaced locations when said first and said second support members are rotated; an annular inductance device positioned between said first and said second series of magnetic elements so as to extend through said partially enclosed spaces, and being inductively coupled to said magnetic circuit means whereby the inductance of said inductance device is successively changed in response to the periodic alignmnet of said first and second series magnetic elements; and a pair of output terminals connected to said inductance device for providing said signal at a frequency corresponding to the changes of inductance and thereby indicative of the combined rotating speeds of said two rotating devides.

3. An apparatus for producing electrical signals which are indicative of the combined speeds of first and second rotating devices, comprising: an annular inductance coil means; a first nonmagnetic rotatable support means adjacent one axial side of said inductance coil means and connected for rotation with said first rotating device; a plurality of first magnetic elements circumferentially facing said inductance coil means in uniformly arcuately spaced relationship on said first nonmagnetic rotatable support means; a second nonmagnetic rotatable support means adjacent the opposite axial side of said inductance coil means and connected for rotation with said second rotating device; a second magnetic element facing said inductance coil means in a radially disposed relationship therewith on said second rotatable support means and being complementary to each of said plurality of first magnetic elements for periodically aligning and magnetically coacting with each of said plurality of first magnetic elements for successively forming low reluctance magnetic circuit paths which vary the impedance of said inductance coil means in response to relative rotation between said first and said second support means; a source of alternating current signals connected to said inductance coil means; and a detector circuit means coupled to said source of alternating current signals and responsive to variations produced in said alternating current signals by variation of the impedance of said inductance coil means, whereby said detector circuit means develops pulse signals having an output frequency which provides an indication of the combined speeds of said first and said second rotating devices.

4. An apparatus for producing electrical signals which are responsive to the combined rotating speeds of two rotating devices, comprising: a stationary mounted inductance coil means; first and second nonmagnetic discs axially aligned with each other and with the center axis of said inductance coil means; said first nonmagnetic disc including a plurality of radially disposed and cicumferentially spaced ferrite bar elements; said second disc including at least one C-shaped ferrite core element having ends thereof extending toward said first disc and the center opening of the C-shaped core element including said inductance coil means; means connecting said first nonmagnetic disc for rotation by one of said rotating devices; means connecting said second nonmagnetic disc for rotation by said second rotating device whereby said inductance coil means has portions thereof substantially enclosed by the mutual alignment of said C-shaped ferrite element and one of said ferrite bar elements such that low reluctance magnetic circuit paths being periodically formed by the respective motion of said first and said second discs to thereby periodically very the inductance of said inductance coil means; and a frequency sensing means including a carrier oscillator circuit and a tuned resonant circuit including said inductance coil means, said carrier oscillator circuit and said tuned resonant circuit connected together that such amplitude modulated electrical signals are developed in accordance with said periodic variations of inductance of said inductance coil means whereby the frequency at which said amplitude modulated signals are produced is determined by the number of said plurality of ferrite bar elements included in said first disc and the combined speeds of said first and said second rotating devices.

PO-1050
(5/69)

UNITED STATES PATENT OFFICE
CERTIFICATE OF CORRECTION

Patent No. __3,569,782__   Dated __March 9, 1971__

Inventor(s) __Jalal T. Salihi and George J. Spix__

It is certified that error appears in the above-identified patent and that said Letters Patent are hereby corrected as shown below:

Page 1

Column 1, line 21, delete "inthe" and substitute -- in the --
         line 22, delete "3,323,023" and insert -- 3,323,032
         line 23, after "frequency" insert -- signals --;
         line 29, delete "servometer" and substitute -- servomotor --;
         line 30, delete "mechnism" and insert -- mechanism
         line 31, delete "electric" and substitute -- electrical --;
         line 31, delete "a" and substitute -- an --;
         line 48, delete "inductice" and insert -- inductive
         line 52, delete "servometer" and substitute -- servomotor --;
         line 65, delete "servometer" and substitute -- servomotor --;
         line 69, delete "iduction" and substitute -- induct: -- .
Column 2, line 7, delete "element" and insert -- elements --;
         line 20, after "illustrated" insert -- in --;
         line 24, delete "combining" and insert -- sensing --
         line 29, delete "occuring" and substitute -- occurring --;
         line 51, delete "includes" and insert -- include --;
         line 63, delete "qually" and substitute -- equally -
         line 66, after "cores" insert -- 38 --;
         line 70, after "circumferentially" insert -- spaced
         line 71, delete "frequencing" and insert -- frequency -- .
Column 3, line 6, after "means" insert -- 32 --;
         line 10, after "corresponding" insert -- to --;
         line 37, delete "45" and insert -- 40 --;
         line 43, delete "las" and substitute -- als --;
         line 56, delete "course" and substitute -- source --
         line 57, delete "avariable" and insert -- a variable
         line 59, delete "convertor" and insert -- converter

PO-1050
(5/69)

UNITED STATES PATENT OFFICE
CERTIFICATE OF CORRECTION

Patent No. 3,569,782  Dated March 9, 1971

Inventor(s) Jalal T. Salihi and George J. Spix

It is certified that error appears in the above-identified patent and that said Letters Patent are hereby corrected as shown below:

Page 2

```
Column 3, line 60, delete "the" (second occurrence) and insert
                     -- this --;
          line 68, delete "degress" and substitute -- degrees
          line 71, after "source" insert -- 66 --.
Column 4, line  3, delete "aofrementioned" and substitute
                     -- aforementioned --;
          line  7, delete "amplifer" and substitute --
                     amplifier --;
          line 34, delete "the"
          line 44, delete "of" (first occurrence)
          line 46, after "magnetic" insert -- field --;
          line 56, delete "frequently" and substitute --
                     frequency --;
          line 65, delete "turned" and insert -- tuned --.
Column 5, line 28, delete "to the"
          line 31, after "winding" insert -- of --;
          line 33, after "only" insert -- and --;
          line 52, delete "of"
          line 53, delete "a"
          line 63, delete "pulses" and substitute -- pulse --;
          line 70, delete "occuring" and substitute --
                     occurring --;
          line 75, delete "74b" (first occurrence) and
                     substitute -- 74a --.
Column 6, line 43, delete "alignmnet" and substitute --
                     alignment --;
          line 52, delete "alignmnet" and substitute --
                     alignment --;
          line 56, delete "rate" and insert -- rates --;
          line 64, after "a" insert -- second --;
          line 73, delete "memners" and substitute -- member -
          line 74, delete "alignmnet" and substitute --
                     alignment --.
```

PO-1050
(5/69)

UNITED STATES PATENT OFFICE
CERTIFICATE OF CORRECTION

Patent No. __3,569,782__      Dated __March 9, 1971__

Inventor(s) __Jalal T. Salihi and George J. Spix__

It is certified that error appears in the above-identified patent and that said Letters Patent are hereby corrected as shown below:

Page 3

Column 7, line 1, delete "periodicallyk"
          line 10, delete "alignmnet" and substitute -- alignment --;
          line 15, delete "devides" and substitute -- devices
Column 8, line 14, delete "cicumferentially" and substitute -- circumferentially --;
          line 25, after "paths" insert -- are provided relati to said inductance coil means, said magnetic circuit paths --;
          line 26, delete "motion" and insert -- rotation --;
          line 27, delete "very" and substitute -- vary --;
          line 31, delete "that such" and substitute -- such that --.

Signed and sealed this 27th day of March 1973.

(SEAL)
Attest:

EDWARD M. FLETCHER, JR.
Attesting Officer

ROBERT GOTTSCHALK
Commissioner of Patents